United States Patent

Wolff et al.

[15] 3,644,733
[45] Feb. 22, 1972

[54] ELECTRON MICROSCOPE DEFLECTION SYSTEM FOR DIRECTING THE BEAM AT A PREDETERMINED ANGLE AND DIRECTION AT THE OBJECT

[72] Inventors: Otto Wolff; Dieter Krahl, both of Berlin, Germany

[73] Assignee: Siemens Aktiengesellschaft, Berlin and Munich, Germany

[22] Filed: June 8, 1967

[21] Appl. No.: 644,650

[30] Foreign Application Priority Data

June 10, 1966 Germany .............................. S 104241

[52] U.S. Cl. ................. 250/49.5 A, 250/49.5 C, 250/49.5 D
[51] Int. Cl. ..................................... H01j 37/26, G01n 23/22
[58] Field of Search .................... 250/49.5 A, 49.5 C, 49.5 D, 250/49.5 PE

[56] References Cited

UNITED STATES PATENTS 2,886,727  5/1959  Haine ............................. 250/49.5 X

FOREIGN PATENTS OR APPLICATIONS 723,772  2/1955  Great Britain ....................... 250/49.5

*Primary Examiner*—William F. Lindquist
*Attorney*—Curt M. Avery, Arthur E. Wilfond, Herbert L. Lerner and Daniel J. Tick

[57] ABSTRACT

A particle beam device such as an electron microscope has a predetermined optical axis and means for directing a particle beam at a predetermined angle to an object. The beam-directing means has a first pair of electrical deflecting coils situated at a first plane for deflecting the beam away from the optical axis toward a second plane, the first and second planes each being normal to the optical axis and the second plane being disposed intermediate the first plane and the object. A second pair of electrical deflecting coils are situated at the second plane for deflecting the beam in a direction opposite to the direction of deflection provided by the first pair of deflecting coils so as to direct the beam to the object at the predetermined angle. The first and second deflecting coil pairs deflect the beam in a third plane which is perpendicular to the first and second planes and which contains the optical axis. An additional pair of electrical deflecting coils are situated at least at one of the first and second planes. An electrical supply is connected to the additional pair of coils for supplying the latter with an excitation proportional to the excitation of the first and second pairs of deflecting coils thereby enabling the additional deflecting pair of coils to compensate for undesired deflections of the beam out of the third plane caused by the first and second pairs of deflecting coils.

1 Claims, 3 Drawing Figures

PATENTED FEB 22 1972

ELECTRON MICROSCOPE DEFLECTION SYSTEM FOR DIRECTING THE BEAM AT A PREDETERMINED ANGLE AND DIRECTION AT THE OBJECT

Our invention relates to corpuscular ray devices, such as electron microscopes.

In particular, our invention relates to a structure for deflecting corpuscular rays in a corpuscular ray or particle beam device, the device including a first deflecting means in a first plane which is normal to the optical axis for deflecting the ray or beam away from the optical axis toward a second plane which is normal to the optical axis and situated between the first plane and the object. At this second plane is located a second deflecting means for deflecting the ray which has been deflected by the first deflecting means in a direction opposite to the direction of deflection provided by the first deflecting means so that from the second plane the ray can be deflected by the second deflecting means at a predetermined angle to the object.

Deflecting structures of this type provide in this electrical manner a structure which produces the equivalent of tilting of the ray generator about a point which coincides with the point at which the object is located, provided that care is taken to see to it that when the deflecting structure operates the ray reaches the same point or object as that which is reached by the undeflected ray when the deflecting structure does not operate.

Experience has shown that because of inaccuracies in the manufacture of the deflecting structure as well as inaccuracies in the centering thereof and as a result of lack of homogeneity in the electrical or magnetic deflecting fields situated at the deflecting planes, when the angle at which the corpuscular ray is to impinge the object is changed, there is very frequently an undesired wandering of the ray in a direction which is perpendicular to the desired deflection first away from and then back toward the optical axis, which is to say an undesired wandering of the ray in a plane which is perpendicular to the plane which contains the optical axis and in which the desired deflections take place. It is therefore as a rule not possible with deflecting structures of the above type to provide impingement of the corpuscular ray at all times on the very same object region at different impingement angles.

It is accordingly a primary object of our invention to eliminate the above problem.

More particularly, it is an object of our invention to provide a structure which will reliably maintain a corpuscular ray which is deflected first away from the optical axis and then back toward the optical axis in a predetermined plane which contains the optical axis and in which both of these deflections take place, so that it becomes possible in this way to accurately control the angle of impingement of the corpuscular ray on the object.

Furthermore, it is an object of our invention to provide a device of the above type which not only is capable of accurately controlling the angle of impingement of a corpuscular ray on a given object but also is capable of accurately controlling the direction of the ray which impinges on the object.

As was indicated above, the structure of our invention includes a first deflecting means situated at a first plane which is normal to the optical axis for deflecting the corpuscular ray away from the optical axis toward a second plane which is normal to the optical axis and which is situated between the first plane and the object. At this second plane is a second electrical deflecting means for deflecting the ray which has been deflected by the first deflecting means in a direction opposite to the direction of deflection provided by the first deflecting means, so as to direct the ray at a predetermined selected angle to the object. These deflections which are provided by the first and second deflecting means should ideally take place in a predetermined third plane which contains the optical axis and in which the ray travels during its deflection by the first and second deflecting means. In accordance with our invention at least one of these planes which is normal to the optical axis is provided with an additional deflecting means for deflecting the ray in a fourth plane which contains the optical axis and is perpendicular to the third plane, so that this additional deflecting means will compensate for any wandering of the ray out of the third plane and will reliably maintain the ray in the third plane. A particularly good embodiment of our invention, which does not require much space, has the additional compensating deflecting means in the form of coils which are angularly displaced about the optical axis by 90° with respect to coils which form the first and second deflecting means respectively situated at the first and second planes which are normal to the optical axis. In the event that the structure, instead of being made up exclusively of coils, is made up of deflecting plates as well as deflecting coils, so that, for example, the first and second deflecting means are in the form of coils while the additional deflecting means take the form of deflecting plates, or in a reverse arrangement where the first and second deflecting means take the form of plates while the compensating deflecting means takes the form of coils, then because coils and plates respectively provide fields whose forces act in mutually perpendicular directions on the corpuscular ray, it is not necessary to angularly displace the coils and plates with respect to each other.

In this later case it is of advantage to mount the deflecting plates on the deflecting coils in the form of pole shoes which are respectively insulated from the coils.

In many cases it is desirable not only to be able to adjust the angle of impingement of the corpuscular ray with respect to the object but also to be able to select the direction of the corpuscular ray which impinges upon the object. While deflecting structures which act in a single plane are sufficient for determining the angle of impingement of the corpuscular ray on the object, in order to change the direction of the corpuscular ray this same arrangement must be provided also to act in a second plane which is perpendicular with respect to the plane in which the first deflecting structure acts. Thus, according to a further embodiment of our invention, capable of providing a selected direction for the ray as well as a selected angle of impingement on the object, each of the above-mentioned planes which are normal to the optical axis and which respectively are provided with deflecting means for deflecting the ray in a predetermined plane so as to provide a selected angle of impingement are respectively provided with further deflecting means acting perpendicularly to the first deflecting means so as to control the direction of the corpuscular ray. In addition, in accordance with our invention at least one of these planes which is normal to the optical axis and which is provided both with a deflecting means for deflecting the ray in one plane and a deflecting means for deflecting the ray in a second plane which is perpendicular to the latter plane is provided with an additional deflecting means for deflecting the ray in a direction which is the same direction as that in which the ray is deflected by the deflecting means with which the additional deflecting means does not coact, so that the additional deflecting means compensates for deflection in a direction which is the same as that in which the ray is deflected by the deflecting means which is not compensated by the particular additional deflecting means. In other words, assuming that all of the deflecting means take the form of coils, then the additional compensating coils are situated at the same location as those deflecting coils which provide a deflection which is not compensated by the particular deflecting coils. Therefore, with such a construction it is possible, for example, to mount the additional compensating deflecting coils on the same coil carriers as those which carry the coils which provide deflections which are not compensated by the particular compensating deflecting coils.

Experience has shown that the extent of undesired deflection of the corpuscular ray out of the plane in which it should ideally remain is always proportional to the magnitude of the desired deflection. It is possible, therefore, to achieve an automatic compensation by providing for the additional compensating deflecting means a potential which has a predetermined relationship with respect to the potential of the deflecting means whose deflection is compensated. This potential of the compensating deflecting means and the compensated deflecting means can be the same or the potential of the compensating deflecting means may be a predetermined proportion of the potential of the deflecting coils or plates whose deflection is compensated. Of course, because of the unavoidable inaccuracies in systems of this type, there will be with respect to the compensating deflecting means initially an equalizing adjustment in accordance with the potential or coil current required for the particular compensation.

Our invention is illustrated by way of example in the accompanying drawings which form part of this application and in which.

Figure 1:
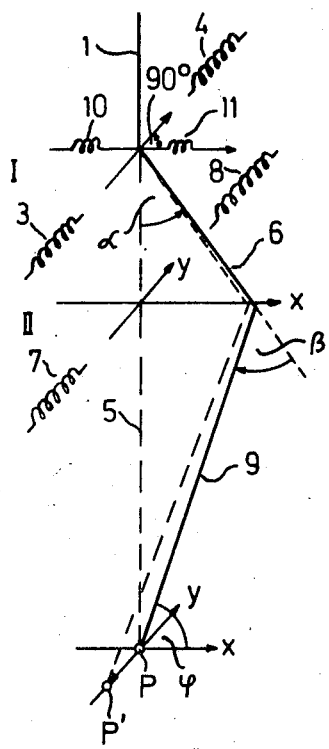
FIG. 1 shows schematically one possible embodiment of a ray deflecting structure of our invention for accurately achieving a predetermined angle of impingement of the ray on a given object.

Referring to FIG. 1, the structure schematically illustrated therein is capable of deflecting the electron ray 1 so as to achieve a predetermined impingement angle $\phi$. The disclosed structure of FIG. 1 will provide deflections of the ray 1 with deflecting means which are located in the planes I and II which are normal to the optical axis 5. The deflecting means which are situated in the planes I and II respectively provide deflections of the ray I in different, opposed directions and in a third plane which is perpendicular to the planes I and II and which contains the optical axis 5, this third plane being the plane of FIG. 1.

In the embodiment illustrated in FIG. 1, there is located at the deflecting plane I a pair of diametrically opposed deflecting coils 3 and 4 which are respectively situated on opposite sides of the optical axis and which respectively have a common axis situated in the plane I and extending perpendicularly with respect to the plane of FIG. 1, so that the common axis of the deflecting coils 3 and 4 is perpendicular to the deflecting plane. The coils 3 and 4 form a deflecting means in the plane I for deflecting the corpuscular ray 1 by an angle $\alpha$ away from the optical axis 5 toward the second plane II which is normal to the optical axis and which is situated between the first plane I and the object P. The ideal deflection of the corpuscular ray 1 at the plane I is shown by the solid-line path 6.

At the second plane II are situated the second deflecting coils 7 and 8 which form the second electrical deflecting means, and these coils also have a common axis which is in the plane II and which is perpendicular to the plane of FIG. 1, so that the common axis of the coils 7 and 8 is parallel to the common axis of the coils 3 and 4 and is perpendicular to the deflecting plane of FIG. 1. These coils or electrical deflecting means 7 and 8 serve to deflect the ray in a direction which is opposed to the direction of deflection provided by the coils 3 and 4, the coils 7 and 8 in the illustrated example deflecting the ray from the path 6 by an angle $\Delta$, so that the ray is deflected to move along the path 9 and impinge on the object P which would be impinged on by the nondeflected ray 1 when the latter moves along the optical axis 5 on which the object P is located.

As the result of inaccuracies of the different deflecting coils, the deflection of the corpuscular ray 1 does not take place accurately in the direction of x-coordinates which are situated in the third plane of FIG. 1 but, as is shown in doted lines, the deflection in practice also takes place, if only to a small extent, in a direction which is perpendicular to the x-coordinates, which is to say in the direction of the Y-coordinates, away from the plane of the drawing and in fact in a fourth plane which contains the optical axis and the Y-coordinates and which is perpendicular to the third plane which contains the optical axis and x-coordinates, this third plane being the plane of FIG. 1. As a result, when a predetermined impingement angle $\phi$ is adjusted, the deflected ray will not reach the old object P but instead will reach an object point P' which is displaced from the point P.

In order to compensate for this undesired deflection of the ray in the direction of the Y-coordinates, there is provided in accordance with our invention in the embodiment of FIG. 1 at the deflecting plane I additional deflecting means in the form of compensating coils 10 and 11 which are arranged in such a way that they compensate for the undesired ray deflection in the Y-direction. For this purpose the compensating coils 10 and 11 are angularly displaced about the optical axis by 90° with respect to the deflecting coils 3 and 4. With this arrangement the adjustment of the impingement angle $\phi$ will be automatically compensated for in such a way that the newly selected impingement angle will always direct the deflected ray to the same object point P, if the current supplied to the compensating coils is proportional to the current supplied to the deflecting coils 3 and 4, or by a suitable selection of the number of windings of the coils when supplying the latter with the same current or by providing for all of these coils at the plane I the same potential or for the compensating coils a potential which is proportional to the potential of the deflecting coils 3 and 4, so that the greater the deflection the greater the compensation and thus an automatic reliable maintenance of the deflected ray in the plane which contains the x-coordinates will be achieved.

Figure 2:
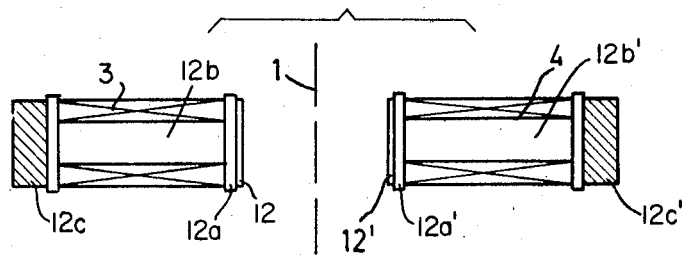
FIG. 2 schematically indicates another embodiment of the structure of FIG. 1.

In the example which is illustrated in FIG. 1 the structure of our invention includes only deflecting coils. FIG. 2 shows an embodiment for a construction where, for example, a pair of deflecting coils 3 and 4 are provided but the compensating coils 10 and 11 are replaced by deflecting plates 12 and 12a. These deflecting plates are provided with a potential suitable for compensating the undesired deflection of the ray by the pair of coils 3 and 4. Reference numerals 12 and 12' denote the pole plates comprising the deflection system which compensates for unwanted deflections. A potential or voltage is applied to the pole plates which is proportional to the excitation of the coils 3 and 4, the latter being wound on magnetic cores 12 and 12' respectively. The pole plates are carried on cores 12b and 12b' respectively and are insulated therefrom by insulating discs 12a and 12a'. The ends of the cores 12b and 12b' not facing the ray axis 1 are positioned opposite the inner surface of the common magnetic yoke 12c.

The angle between the deflecting coils on the one hand and the compensating deflecting means on the other hand is 0°, so that it is of advantage to use, as shown in FIG. 2, a deflecting plate 12 which replaces the deflecting coil of FIG. 11 and which is in the form of a pole shoe. This pole shoe is arranged directly on the coil 4 but is insulated therefrom.

Our invention can also be used when it is desired not only to be able to adjust the angle of impingement of the corpuscular ray on the object but also to bring about a deflection of the electron ray in the direction of the Y-coordinates, by arranging additional deflecting coils or plates at the planes I and II so as to double the deflections and thus achieve for the impingement angle $\phi$ any desired direction in the x—y planes I and II. For this purpose it is necessary also to provide for the second deflecting structure corresponding compensating means so that for example where only coils are used for deflection and compensation, the compensating coils which compensate for those deflections which are provided in the x-directions extend in the y-directions while the compensating coils which compensate for deflections in the y-directions are situated in the x-directions. Thus, with such a construction there will be located at each of the planes I and II a first pair of deflecting coils on the x-coordinates to provide deflections on the y-coordinates and a second pair of deflecting coils on the y-coordinates to provide deflections on the x-coordinates. At the x-coordinates will be situated compensating coils to compensate for undesired deflections provided by the deflecting coils at the y-coordinates while at the y-coordinates there will be situated compensating coils to compensate for undesired deflections provided by the deflecting coils at the x-coordinates. In other words, the entire structure shown in FIG. 1 is duplicated but turned by 90° with respect to the structure of FIG. 1. The composite structure is illustrated in schematic representation in FIG. 3 where a pair of deflecting coils 13 and 14 in plane I and a pair of deflecting coils 15 and 16 in plane II serve to deflect the particle beam in plane IV on the $y$-coordinate as shown by the broken line 19. Compensating coils 17 and 18 compensate for any undesired deflections in plane III by deflecting coils 13 and 14 and deflecting coils 15 and 16.

Figure 3:
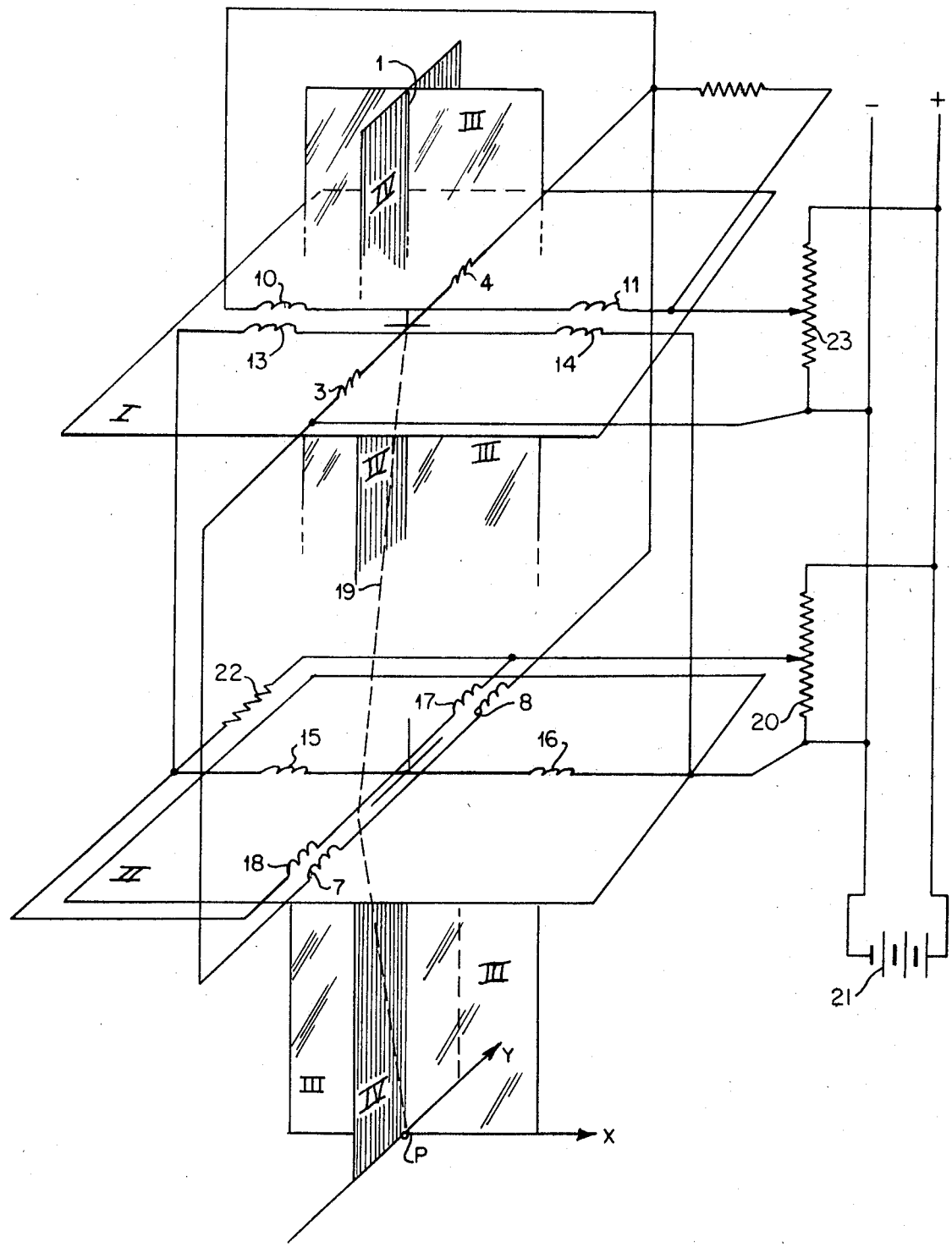
FIG. 3 shows schematically a composite structure for achieving for the angle of impingement any desired direction in the x–y plane I and II.

FIG. 3 also shows an electrical circuit arrangement for supplying excitation to the deflecting coils for deflecting the beam in plane IV and the associated compensating coil pair. The deflecting coil pairs 15, 16 and 13, 14 are energized from variable resistor 20 supplied by source 21. Resistor 20 is adjustable for setting the coil excitation in accordance with the desired deflection of the beam in plane IV. A voltage drop appears across resistance 22 and functions as an energizing voltage for the compensating coils 17 and 18. Accordingly, the excitation current flowing through compensating coils 17 and 18 is proportional to the excitation current in deflecting coil pairs 15, 16 and 13, 14.

A separate and like circuit supplies excitation to the deflecting coil pairs 3, 4 and 7, 8 as well as to compensating coil pair 10, 11 from variable resistor 23. Deflecting coil pairs 3, 4 and 7, 8 deflect the beam in plane III and compensating coil pair 10, 11 compensates for undesired deflections of the beam out of plane III. As was indicated above, with such an arrangement the deflecting and compensating coils may be situated on common coil carriers with the compensating coils being on the same carriers which support those coils whose deflections are not compensated by these particular coils. As was indicated above, deflecting coils situated in a single plane will be sufficient to determine the angle of impingement of the ray on the object, and since it is also possible when changing the angle of impingement for the ray to wander from the desired object point in the deflection plane, the deflecting coils or plates which bring about the desired angle of impingement can be regulated so as to properly direct the ray to the object in the deflection plane.

We claim:

1. In a particle beam device such as an electron microscope having a predetermined optical axis and means for directing a particle beam at a predetermined angle to an object, said beam directing means comprising first electrical deflecting means situated at a first plane for deflecting said beam away from the optical axis toward a second plane, said first and second planes each being normal to the optical axis and said second plane being disposed intermediate said first plane and the object, second electrical deflecting means situated at said second plane for deflecting said beam in a direction opposite to the direction of deflection provided by said first deflecting means so as to direct said beam to the object at the predetermined angle, said first and second deflecting means deflecting said beam in a third plane which is perpendicular to said first and second planes and which contains said optical axis, additional electrical deflecting means situated at least at one of said first and second planes, electrical supply means electrically connected to said additional electrical deflecting means for supplying the latter with an excitation proportional to the excitation of said first and second electrical deflecting means, whereby said additional electrical deflecting means compensates for undesired deflections of said beam out of said third plane caused by said first and second electrical deflecting means, third and fourth electrical deflecting means situated at said first and second planes respectively for deflecting said beam in a fourth plane and directing the beam to said object at a predetermined angle and in a predetermined direction, said fourth plane being perpendicular to said third plane and containing said optical axis, and further electrical deflecting means situated at one of said first and second planes, and further electrical supply means electrically connected to said further electrical deflecting means for supplying the latter with an excitation proportional to the excitation of said third and fourth electrical deflecting means, whereby said further electrical deflecting means compensates for undesired deflections of said beam out of said fourth plane caused by said third and fourth electrical deflecting means.

* * * * *